Jan. 31, 1961 D. A. CARGILL ET AL 2,969,883

PARTS DISTRIBUTION AND STORAGE SYSTEM

Filed June 18, 1956 10 Sheets-Sheet 1

INVENTORS
DON A. CARGILL
AVREL MASON
BY ROBERT A HORVATH
WILLIAM H. DUCKER
Farley, Forster & Farley
ATTORNEYS INVENTORS
DON A. CARGILL
AVREL MASON
BY ROBERT A. HORVATH
WILLIAM H. DUCKER
Farley, Forster & Farley
ATTORNEYS

PARTS DISTRIBUTION AND STORAGE SYSTEM

Filed June 18, 1956

INVENTORS
DON A. CARGILL
AVREL MASON
ROBERT A. HORVATH
WILLIAM H. DUCKER
BY
Farley, Forster & Farley
ATTORNEYS INVENTORS
DON A. CARGILL
AVREL MASON
BY ROBERT A. HORVATH
WILLIAM H. DUCKER
Farley, Forster & Farley
ATTORNEYS INVENTORS
DON A. CARGILL
AVREL MASON
ROBERT A. HORVATH
WILLIAM H. DUCKER
BY Farley, Forster & Farley
ATTORNEYS INVENTORS
DON A. CARGILL
AVREL MASON
ROBERT A. HORVATH
WILLIAM H. DUCKER
BY Farley, Forster & Farley
ATTORNEY.

INVENTORS
DON A. CARGILL
AVREL MASON
ROBERT A. HORVATH
WILLIAM H. DUCKER
BY Farley, Forster & Farley
ATTORNEYS

PARTS DISTRIBUTION AND STORAGE SYSTEM

INVENTORS
DON A. CARGILL
AVREL MASON
ROBERT A. HORVATH
WILLIAM H. DUCKER
BY Farley, Forster & Farley
ATTORNEYS

PARTS DISTRIBUTION AND STORAGE SYSTEM

Filed June 18, 1956 10 Sheets-Sheet 9

INVENTORS
DON A. CARGILL
AVREL MASON
ROBERT A. HORVATH
WILLIAM H. DUCKER
BY
Farley, Forster & Farley
ATTORNEYS INVENTORS
DON A. CARGILL
AVREL MASON
ROBERT A. HORVATH
WILLIAM H. DUCKER
BY
ATTORNEYS 2,969,883

PARTS DISTRIBUTION AND STORAGE SYSTEM

Don A. Cargill and Avrel Mason, Birmingham, Robert A. Horvath, Detroit, and William H. Ducker, Oak Park, Mich., assignors to Cargill Detroit Corporation, Birmingham, Mich., a corporation of Michigan Filed June 18, 1956, Ser. No. 592,075

11 Claims. (Cl. 214—16)

The present invention relates to a storage and distribution system for parts and more particularly to a method and means for storing and distributing parts in accordance with the demand for such parts in an integrated manufacturing process.

In the development of "automation" or integrated manufacturing processes, one of the most persistent and troublesome problems has been the storage and distribution of parts from one manufacturing stage or process to another. The heretofore proposed storage and distribution systems for such processes have been unsatisfactory for various reasons. For instance, it is undesirable to have parts constantly recirculating through a conveyor arrangement, due to wear and tear on the parts themselves, the complex conveying mechanisms required, and the dispensing of parts destined for one work station to a previous work station. It is equally undesirable to place parts in "dead storage" to provide a reserve against the necessity of a continuing supply in case an earlier process were shut down. The placing and removal of parts from such "dead storage" requires extensive and complicated conveying apparatus and causes delays in the supplying of parts to the work stations.

The present invention provides a new and novel storage and distribution system wherein parts are supplied to a plurality of work stations in accordance with the demand for parts at the station. There is no recirculation of parts in the utilization of the present invention, there are no "dead stock" areas in which parts are removed from the system to be later inserted therein upon demand, and a truly efficient first in-first out storage operation is obtained.

The system and controls of the present invention provide for the integral timing of the parts-storage and the parts-dispensing operations through a series of interlocking controls which positively locate the part being dispensed, so that it will be dispatched to only that station at which the demand exists and at which the part is required. In addition, the parts-storage and parts-distributing mechanism are positively synchronized with one another, while the possibility of timing errors and the erroneous dispatching of parts to an undesired one of a plurality of work stations is eliminated.

Generally, the system of the present invention comprises two portions which may be utilized separately or, preferably, in combination. One of these portions is a storage device which may be best described as being of a multilayer construction in which the parts travel in a zig-zag path. More specifically, the storage unit comprises a plurality of vertically arranged zig-zag guides upon which parts are deposited to travel by gravity from the top of one of the layers to the bottom of that layer, onto a vertically traveling conveyor for discharge at the upper end of the next layer. It will be seen that this arrangement provides an exceptionally large storage area within a very compact space and a large number of parts may be stored in the storage area to be dispensed into the distributing portion of the system. The storage area forms an integral part of the over-all system and provides a means for the storage of parts while accommodating the constant circulation of the parts so as to avoid the "dead storage" which has proved to be so disadvantageous in other, earlier systems having the same general object.

The storage unit is provided with a control system for regulating the flow of parts therethrough, this system preferably including means responsive to the level of parts in the storage unit to prevent over-filling of any one of the layers of the storage unit and to regulate the discharge of parts from the storage unit in accordance with the demand of the distribution system. In addition, means are provided for controlling a preceding operation or process to reduce or eliminate the influx of parts into the storage system when the storage system has become filled.

The distribution system is preferably utilized in conjunction with the storage system, such as that heretofore described. Generally, the distribution system includes an escapement mechanism for depositing parts upon a part conveyor mechanism in a predetermined fashion whereby the part is conveyed to a specific one of the plurality of work stations in accordance witn the demand of that specific station. Means are also provided for preventing the discharge of the part from the conveying mechanism to any station other than that at which the demand signal was generated. Parts are placed upon the conveying mechanism only as they are required at the work stations, thus eliminating the constant recirculation of parts. Also, the positive placement of the parts upon the conveying mechanism in a predetermined fashion, which is calculated to fulfill the requirement of a particular work station, makes possible the utilization of a very simple, inexpensive, and convenient mechanism for dropping the part from the conveying mechanism to the work station.

It is, therefore, an important object of the present invention to provide an improved parts storage and distribution system particularly adapted to use in conjunction with an integrated manufacturing process.

Another important object of the present invention is the provision of a method and means for storing and distributing parts in accordance with the parts demand of an integrated manufacturing process.

It is an additional object to provide improved parts storage and distribution system utilizing a multi-layer, zig-zag type storage unit in which a great number of parts may be stored, the parts being constantly available for use to avoid "dead storage."

Yet another object is the provision of a parts storage and distribution system wherein the supplying of parts from a storage unit to a work station is accomplished in accordance with the demand for parts at the work station and without the recirculation of parts.

It is still another important object to provide an improved parts storage and distribution system wherein parts are dispatched from a storage area to a work station by the deposition of a part in a predetermined position upon a conveying mechanism, so that the part is delivered to the work station at which the actual demand exists and from which a demand signal has emanated.

A further object is the provision of a parts storage and distribution system wherein parts constantly moving through a multi-layer storage area are deposited by an escapement mechanism upon a conveyor in such fashion that the part is delivered by the conveyor to a work station from which the escapement-energizing signal has been given to satisfy a demand for a part at that specific work station.

Other and further objects will be more apparent from the following detailed description of a preferred embodiment of this invention and by reference to the drawings forming a part hereof wherein:

On the drawings—

Figure 6 is a fragmentary side elevational view of a portion of the parts distribution mechanism;

As shown on the drawings:

Figure 1:
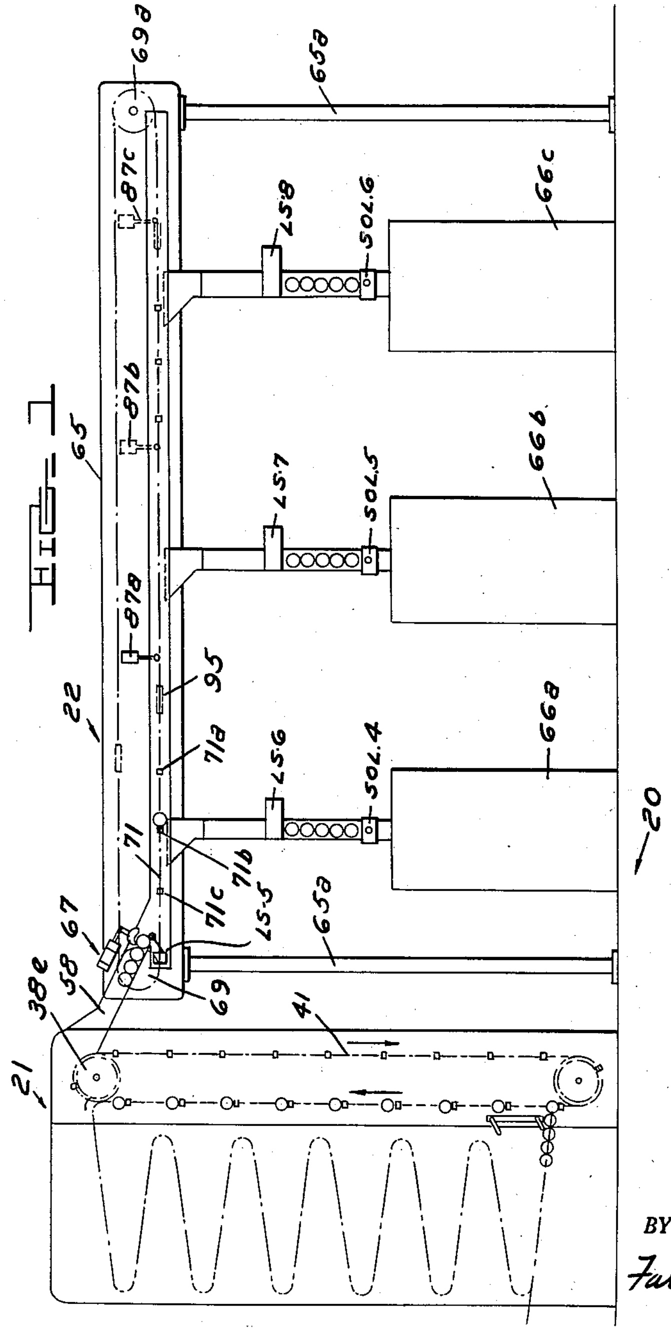
Figure 1 is a schematic representation of a parts storage and distribution mechanism of the present invention.

In Figure 1, reference numeral 20 refers generally to a parts storage and distribution system of the present invention comprising a parts storage mechanism, indicated generally at 21, and a parts distribution mechanism, indicated generally at 22.

*The parts storage mechanism*

As shown in Figures 1, 2, 3, 4, 5, and 9, the storage unit 21 of the present invention comprises generally an outer casing 23 completely enclosing the storage unit.

Figure 3:
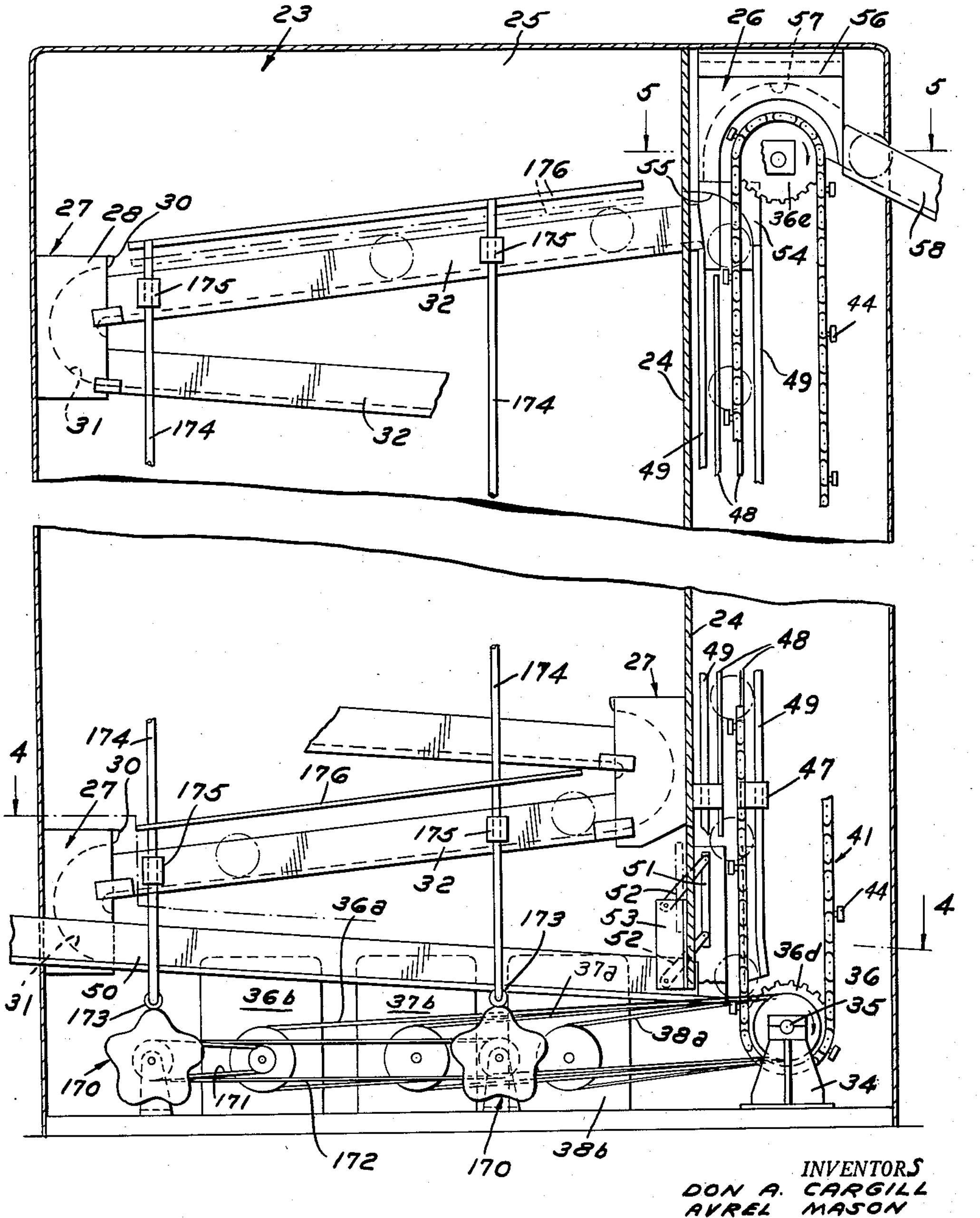
Figure 3 is a partial side elevational view of a storage unit of the present invention with one of the side cover plates removed to illustrate the storage mechanism and the parts conveying arrangement within the storage mechanism.
Figure 4:
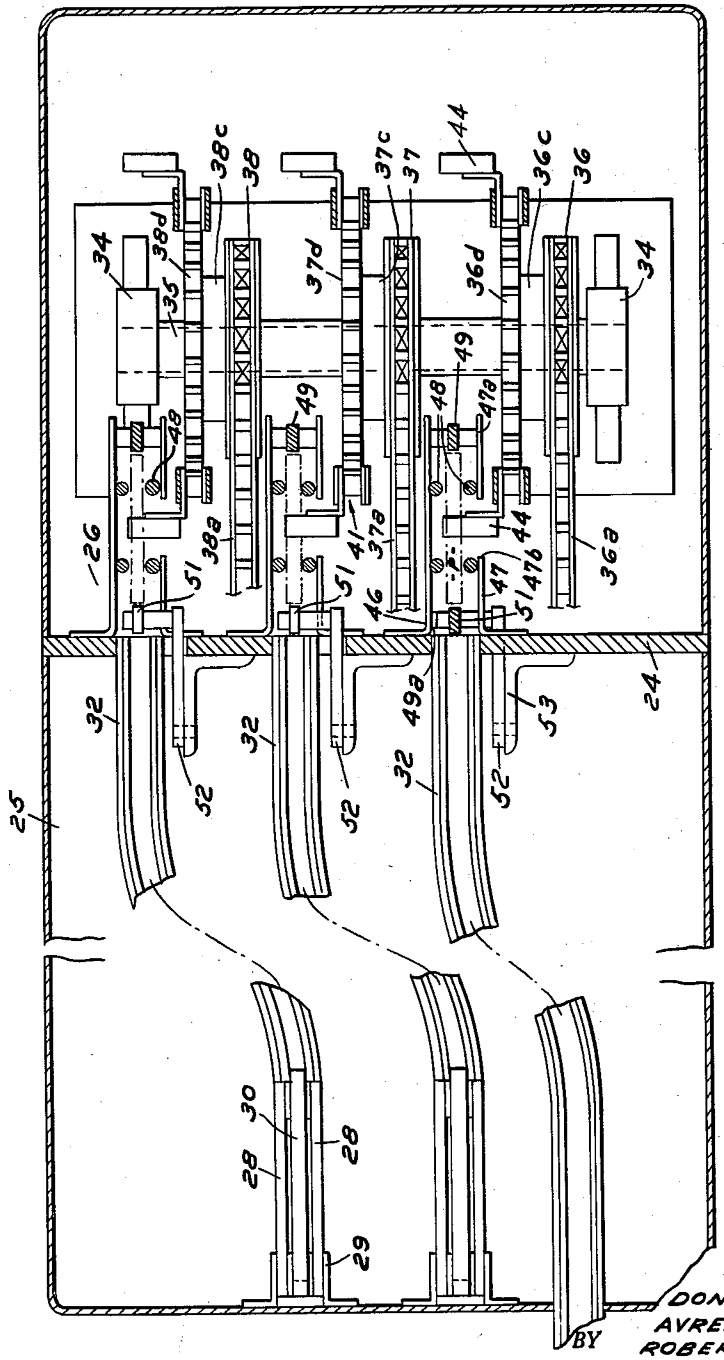
Figure 4 is a sectional view taken along the planes 4—4 of Figure 3.
Figure 5:
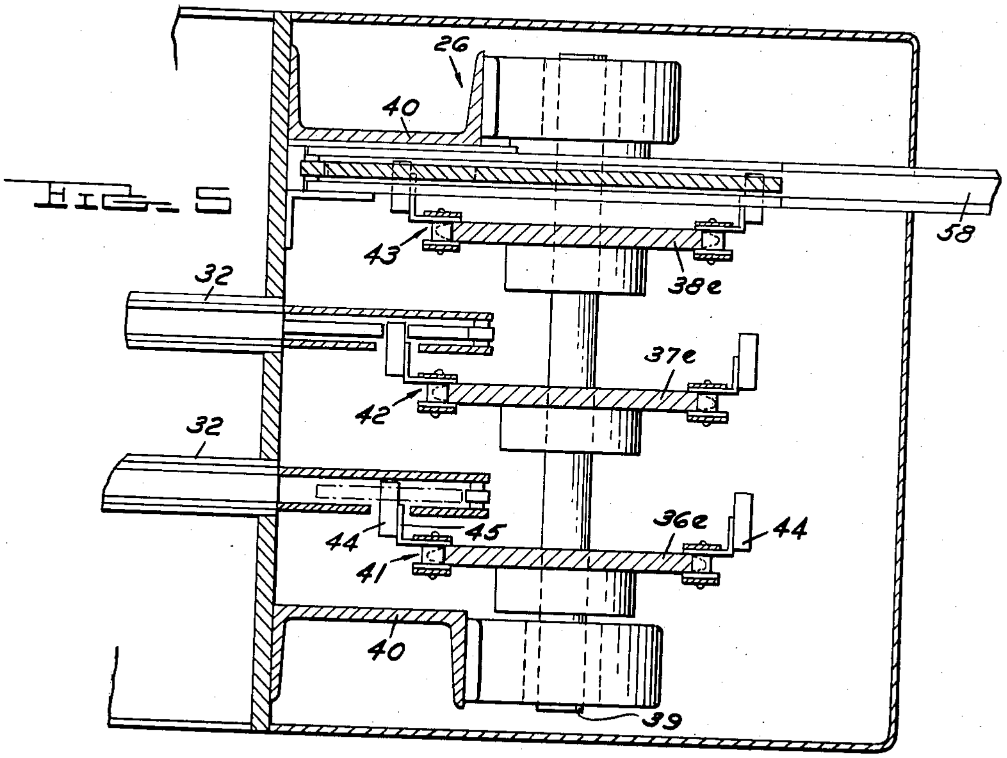
Figure 5 is a fragmentary, enlarged view taken along the planes 5—5 of Figure 3.

Mounted interiorly of the casing to extend vertically and transversely therein is a divider wall 24 (Figures 4 and 5). The wall 24 divides the interior of the storage unit casing 23 into a parts storage compartment 25 and a parts elevation compartment 26. Secured to one wall of the casing 23 and disposed within the casing compartment 25 are a plurality of vertically spaced guide blocks 27 which are substantially identical in configuration and which comprise a pair of laterally spaced side plates 28 (Figures 3 and 4) secured by suitable means, as by brackets 29, to the wall of the casing and having interposed therebetween a guide block 30 having an arcuate inner surface 31 (Figure 3) of semi-circular configuration. Identical guide blocks 27 are secured to the vertical wall 24 in vertically spaced, staggered relation to the blocks 27 carried by the outer casing wall.

Joining the guide blocks 27 are a plurality of channel sections 32, the channel section being of substantially U shape and having open tops. It will be noted from Figure 3 that the channel sections 32 are vertically inclined intermediate the respective blocks 27, so that a cylindrical or rounded part placed on the uppermost channel 32 will move downwardly by gravity through the various channel sections from the uppermost channel sections 32 to the lowermost channel sections 32, the part being guided by contact with the curved inner peripheries 31 of the guide blocks 30 for turning movement at the end of each channel section so that the part is guided into the next lower channel section.

Thus, the blocks 27 and the channel sections 32 cooperate to form a zig-zag storage unit through which parts capable of rolling or sliding movement will be moved by the force of gravity.

Since the parts will normally roll freely down the inclined ramps provided by the blocks 27 and the channels 32, delicate or fragile parts may be damaged by forcible abutment between adjacent parts or between a part and the stop pin mechanism to be hereinafter described.

To prevent such damage, a brake mechanism may be utilized to damp the free fall of parts along the inclined ramps. Such a brake mechanism is illustrated in Figure 3, wherein a pair of spaced cams 170 are provided, one of the cams being driven from the motor **36*b* by a V-belt 171 and drivingly connected to the other cam, as by a V-belt 172. The lobed periphery of each cam 170 is contacted by a roller follower 173 carried by a vertical brake rod 174 extending alongside the vertically spaced channels 32 and slidably guided by brackets 175 fixedly secured to the channel side wall. Extending between the brake rods 174 are a plurality of brake shoes 176** which project laterally to overlie the adjacent channel in parallelism thereto.

The depth of each channel is less than the diameter of the parts carried thereby. The root diameters of the cams 170 are such that the brake shoes will contact parts on the channels when the followers are at the cam root diameters, but the lobe dimensions are such that the shoes are free of the parts during elevation of the shoes thereby. The alternate engagement and release of the parts by the brake shoes will slow down, while not preventing, passage of the parts along the ramps.

It will be noted from Figure 4, that a plurality of sets of such blocks 27 and channels 32 are spaced laterally within the compartment 25 to provide a plurality of layers of zig-zag storage units, as will be hereinafter more fully described. Each such layer may be provided with a brake mechanism, as above described, or a multiple shoe and cam brake assembly may be utilized to control the part flow through each layer.

From Figures 3 and 5, it will be seen that the uppermost channel section 32 projects laterally through the wall 24 for communication with the compartment 26. Similarly, it will be noted from an inspection of Figures 3 and 4 that the lowermost channel sections 32 also project through the wall 24 for communication with the compartment 26.

Disposed in the lower portion of the compartment 26 are a pair of pillow block bearing supports 34 which journal for rotation a shaft 35 extending substantially parallel to the wall 24 and journaling a plurality of sprockets 36, 37 and 38, respectively, each of which is connected through a sprocket chain or the like **36*a*, 37*a*, and 38*a*, respectively, to a driving motor or other source of power 36*b*, 37*b*, and 38*b*, respectively. Of course, one motor may be used to drive all three sprockets, if desired. Each of the sprockets 36, 37 and 38 are joined through an adjacent collar 36*c*, 37*c* and 38*c*, to a chain drive sprocket 36*d*, 37*d*, and 38*d*, the sprockets 36, 37 and 38 being co-rotatable with the corresponding chain drive sprockets 36*d*, 37*d*, and 38*d*. In vertical alignment with each of the chain drive sprockets 36*d*, 37*d*, and 38*d* is a corresponding upper chain idler sprocket 36*e*, 37*e*, and 38*e* (Figures 3 and 5) loosely journaled for rotation on an idler shaft 39 which is supported at its axial end on pillow block supports 40 secured by suitable means (not shown) to the center divider wall 24**.

Lapped about the sprockets 36*d* and 36*e* is a sprocket chain 41, lapped about the sprockets 37*d* and 37*e* is a second sprocket chain 42, and lapped about the third set of sprockets 38*d* and 38*e* is a third sprocket chain 43. The sprocket chains 41, 42, and 43 are identical in all respects and only one such chain need be described in detail here. As illustrated in Figures 3, 4, and 5, these chains, as exemplified in the chain 41, comprise a plurality of chain links joined by cross pins and bearing spaced, laterally extending platforms 44 which are joined to the chain links, as by an angle iron connector 45. The platforms 44 move with the chain and are displaced to the side of the chain so as to not interfere with the passage of the chain about its perspective sprockets. It will be apparent that upon energization of the motors 36*b*, 37*b*, and 38*b*, the sprockets 36*d*, 37*d*, and 38*d* will be driven to drive the sprocket chains 41, 42, and 43, respectively. The platforms 44 carried by the individual sprocket chains will be moved vertically and the left hand reach of the chain (as viewed in Figures 3, 4, and 5) may be utilized to elevate parts within the compartment 26.

To retain parts upon the chain platforms 44, a part guide structure is provided comprising a pair of laterally spaced side support plates 46 and 47 for each flight of conveyor chain 41. The side plates 46 and 47 are located adjacent the lower edge of the central housing wall 24. The plates have welded to their inner surfaces a plurality of vertically extending guide rods 48 closely laterally spaced to receive a part, indicated generally at P in dotted outline in Figure 4, therebetween. Intermediate the two plates are located a pair of longitudinally spaced end guide bars 49 located centrally between the plates 46 and 47 and retained in spaced relation therebetween by cylindrical spacers 49*a*. The guide bars 49 and the guide rods 48 serve to guide the part for vertical movement while accommodating the lifting of the part upon the platform 44 upon which the part is positioned. It will be noted that the side plate 47 is provided with a vertically extending slot 47*a* to accommodate the entry of the platform 44 into the space between the two plates 46 and 47.

From Figure 3, it will be seen that the center supporting wall 24 of the casing 23 terminates short of the floor of the storage compartment and an entrance guide channel 50 is secured to the side wall at the lower edge thereof for accommodating the entry of parts into the storage compartment. Parts rolling or otherwise passing down the entrance channel 50 are allowed to pass therefrom onto the lift platforms 44 of the chain 41 for conveyance upward on the chain.

Located at the exit end of the entrance channel 50 is a plate 51 pivotally connected through parallel links 52 to a support bracket 53 mounted upon the divider wall 24. The plate 51 is freely movable vertically upon its links 52 and, in effect, provides a vertically displaceable lower corner or entrance mouth for the opening in the center wall 24. If a part enters the channel 50 at random at such time that a conveyor flight 44 is passing the loading point, the plate 51 will move upwardly to its position illustrated in Figure 3, thus preventing any jamming of the part against a fixed corner. Thus, plate 51 serves as a "non-jam" unit and insures the presence of only one part upon a given conveyor plate and also prevents jamming of the part against other parts or adjacent fixed parts of the storage wall.

After the part has been deposited upon the conveyor flight or plateform 44, it is elevated thereby to the top of the vertical conveyor flight. Interposed in the path of the flight and immediately beneath the idler sprocket 36*e* is a cam plate 54 having an interior arcuate surface which is contacted by the part and which cams the part from the conveyor flight onto the upper guide channel 32.

After the part has been placed on the upper channel reach 32, the part will continue down the zig-zag formed by the channel iron until it reaches the bottom of the first zig-zag bank. At the bottom of the first zig-zag bank, the parts travel longitudinally and laterally along a laterally displaced channel 32 and the part again passes beneath a second non-jam plate similar to the plate 51 heretofore described and onto the second conveyor chain 42, i.e. the conveyor chain 42 wrapped about the sprockets 37*d* and 37*e*. The part is guided as before and is retained in a vertical path until discharged at the upper end of the conveyor flight reach by a plate of curved contour similar to the plate 54 heretofore described, so that the part is displaced onto the second bank of channel guides 32. The part then travels vertically down along the second bank channel guides until upon reaching the bottom thereof it is again displaced laterally into alignment with the third sprocket chain 43, i.e. the chain lapped about the sprockets 38*d* and 38*e*. After again passing beneath a non-jam unit 51, the part is elevated for a third time.

At the end of the upper reach of the third flight 43, the part comes under a guide block 56 which has a curved inner surface 57 which is approximately 180 degrees in extent so that the part is discharged laterally in an opposite direction of the discharge from the plate 55. This time, the part is discharged to the right, as viewed in Figure 3, of the drawings, onto an additional guide channel 58 which leads to the part distribution portion of the present apparatus, as will be hereinafter more fully described.

Insofar as the parts storage apapratus of the present invention is concerned, it will be appreciated that the present invention provides a new and novel multi-bank zig-zag storage unit wherein parts are constantly moved through the storage unit, the parts travel downwardly in a zig-zag path under the influence of gravity and are constantly guided in a predetermined path. The parts are elevated by a conveyor apparatus to the top of a storage bank to be discharged onto the bank for travel in a zig-zag path under gravity, the parts are again placed upon a vertically traveling conveyor and again are discharged into the second bank for zig-zag travel under gravity. It will be appreciated that as many banks of zig-zag travel as are necessary may be provided to insure an adequate supply of parts. After final discharge from the last of the storage banks, the parts are again transferred to a vertically traveling conveyor and are then passed through a discharge chute or guide to introduce the part into the distribution system of the present invention, as will be hereinafter more fully described.

Figure 9:
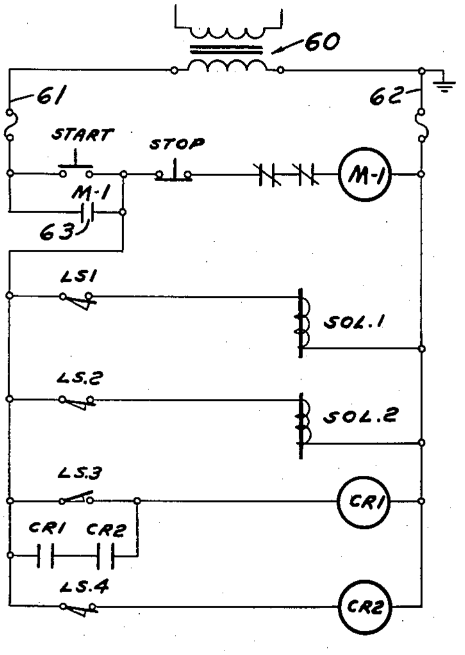
Figure 9 is a diagrammatic representation of a wiring diagram for operating and controlling the storage mechanism.

In Figure 9 of the drawings, there is schematically illustrated the control system for the parts distribution system. Although in the illustrated embodiment of the invention, three different motors 36*b*, 37*b*, and 38*b* are utilized, insofar as the controls are concerned, all of the motors are preferably started and stopped at the same time. Hence, the control system includes a current supply, indicated generally at 60, and a pair of current lines 61 and 62. The motors 36*b*, 37*b*, and 38*b* are controlled through start and stop push button switches which, when the motors are operating, close a circuit through a relay M1 which in turn energizes contacts 63 of a holding circuit by-passing the start button.

Figure 2:
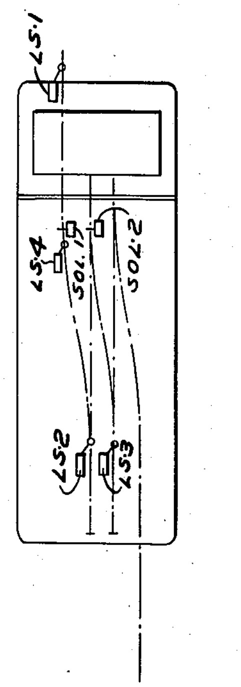
Figure 2 is a schematic representation of the storage area alone illustrating the flow of parts through the storage area.

A first limit switch LS1 is located, as illustrated in Figure 2, on the discharge channel 58 to constitute a control for the supply of parts immediately available to the distribution portion of the present invention. When the limit switch LS1 is closed, as upon the presence of an adequate supply of parts in the discharge channel 58, solenoid SOL1 is actuated to insert a stop pin at the bottom of the last layer of the zig-zag storage unit 21, thus preventing the passage of more parts to the discharge channel 58, although the supply conveyor reach runs continuously.

A second limit switch LS2 is located at the top of the last level or second bank of the zig-zag storage unit 21. When limit switch LS2 is closed, solenoid SOL2 is energized to retract a second stop pin, and when the limit switch LS2 is opened the solenoid SOL2 is de-energized to insert the second stop pin in the path of parts leaving the first bank of the zig-zag storage unit onto the second conveyor flight, that is the flight lapping the sprockets 37*d* and 37*e*. The insertion of this pin will prevent the supplying of more parts to the second zig-zag storage passage. Since the limit switch LS2 is located on the top of the second level, it will be opened to insert the stop pin of solenoid SOL2 only when the second level is completely full and no more parts can be accommodated therein.

Limit switch LS3 is located at the top of the first level of the zig-zag storage unit 21, i.e. at the point of entrance of parts into the storage unit. When this limit switch LS3 is closed, the storage unit is completely full and therefore closing of limit switch LS3 indicates the high level limit of parts within the storage unit. An additional limit switch LS4 is located at the bottom of a second level of the storage unit, that is adjacent the exit end of the zig-zag storage unit. When limit switch LS4 is open, then there are only a small number of parts left in the storage unit and available for distribution to the work stations. It will be noted that limit switch LS3 when closed energizes a relay CR1 and limit switch LS4 when closed energizes a relay CR2. These relays control contacts CR1 and CR2 which by-pass the limit switch LS3.

Once both the limit switches LS3 and LS4 are closed, the previous operation is stopped, inasmuch as the storage unit is completely full and can accommodate the entry of no more parts from any preceding operation. As the parts within the storage unit are used, the limit switch LS3 will be opened, but the relay contacts will remain closed to by-pass the limit switch LS3, so that the previous operation will not be started again until the storage unit is substantially empty and the limit switch LS4 is allowed to open. At this time, the low level of parts within the storage unit is attained and the storage unit can accommodate a relatively large number of additional parts from a preceding operation. In other words, once the preceding operations are stopped because the top level limit switch LS3 has been closed, the preceding operation will not again be started until after the zig-zag storage unit 21 is substantially empty and the bottom limit switch LS4 is opened.

The location of the limit switches LS1 through LS4 and the location of the solenoids SOL1 and SOL2 with their stop pins is illustrated schematically in Figure 2 of the drawings.

Alternatively, the appropriate one of the three motors 36*b*, 37*b*, and 38*b* can be controlled to stop the associated conveyors when the switch indicating that the storage unit is full, e.g. switch LS3, is actuated.

*The parts distribution system*

As illustrated schematically in Figure 1 and in detail in Figures 6, 7, 8 and 10, the parts distribution system is enclosed within a housing 65 which is superimposed over a plurality of work stations, which may take the form of machine tools or the like 66*a*, 66*b*, and 66*c* (Figure 1).

More particularly the casing 65 is supported upon posts 65*a* at a level substantially lower than the level of the idler sprocket 38*e* of the channel reach of chain 43 which discharges parts from the storage unit 21. As seen in Figure 1, parts discharged from the storage unit through channel 58 are retained in the channel 58 by means of an escapement mechanism, indicated generally at 67, and hereinafter described in more detail. The escapement mechanism 67 controls the flow of parts onto a conveyor means, such as a conveyor chain 71, which is guided for movement in a lower horizontal flight and in an upper horizontal flight about a pair of sprockets 69 and 69*a*, one of which is driven by an electric motor (not shown).

Figure 8:
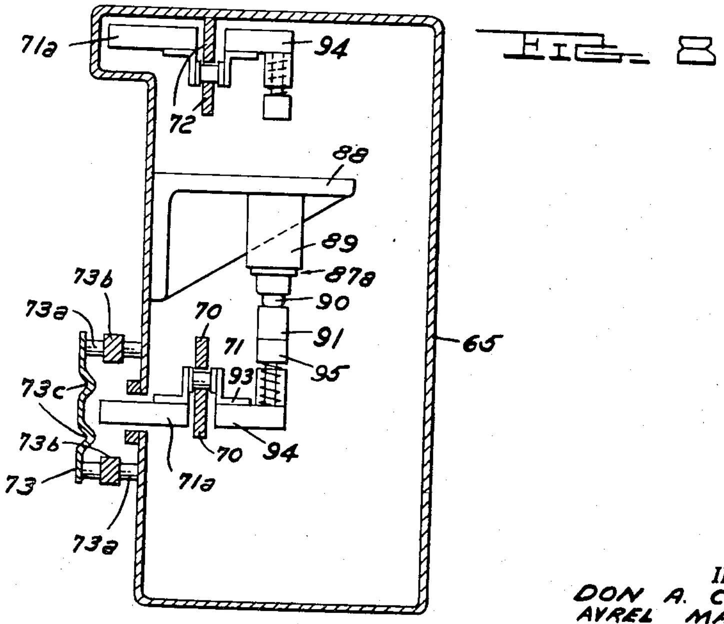
Figure 8 is a sectional view taken along the planes 8—8 of Figure 6.
Figure 5:
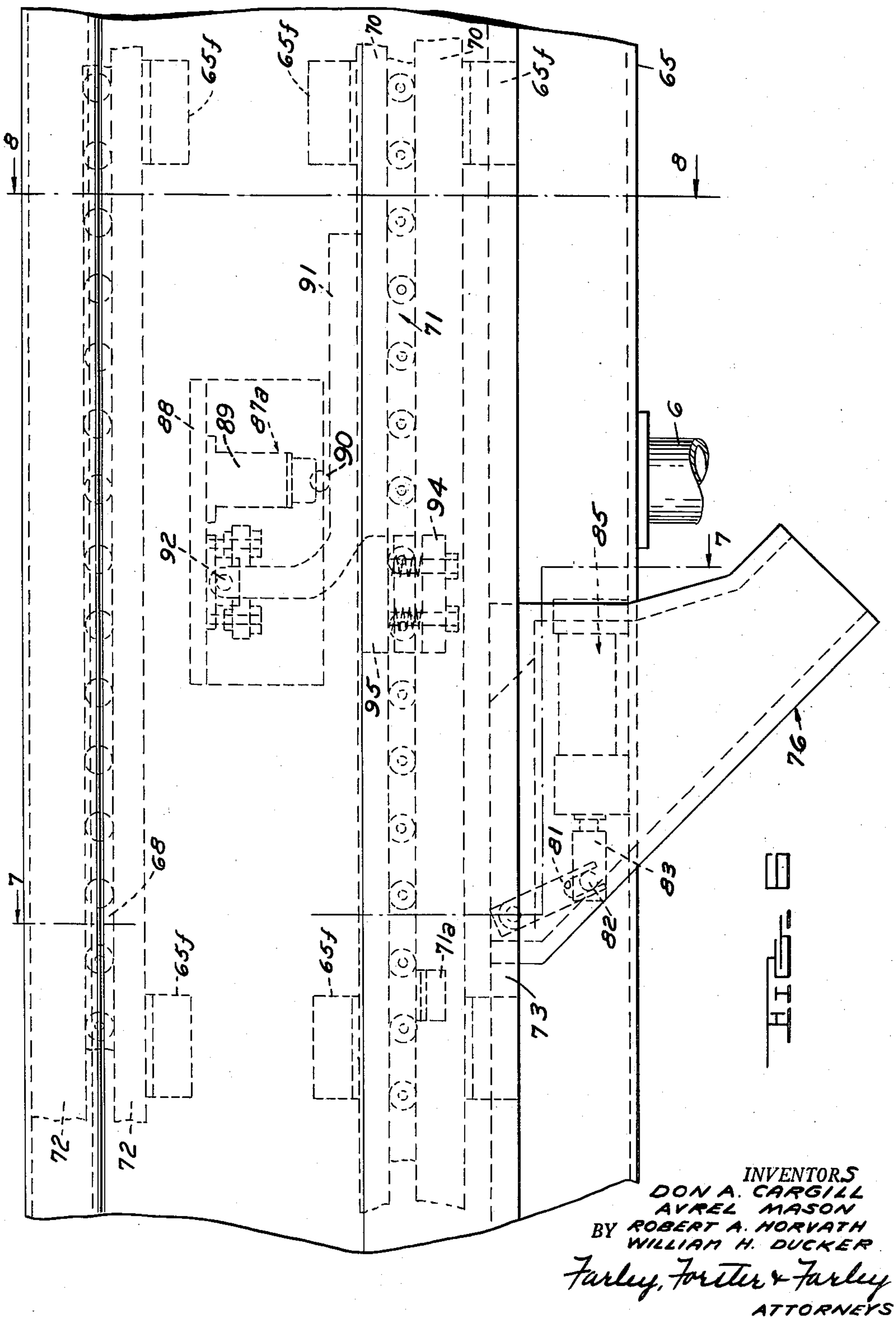
Figures 7, 11:
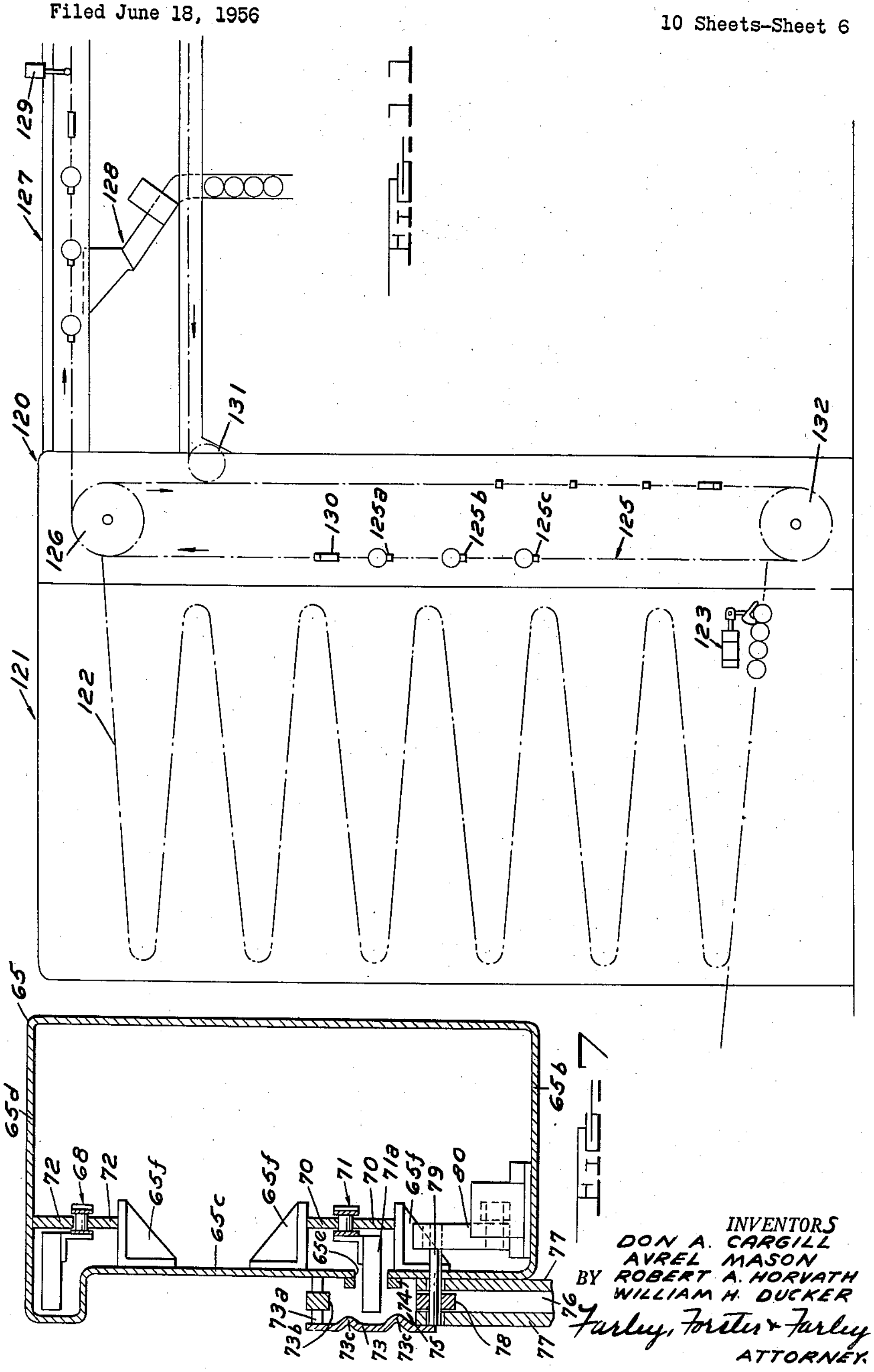
Figure 7 is a sectional view taken along the planes 7—7 of Figure 6.
Figure 11 is a view similar to Figure 1 schematically representing a modified form of integrated parts storage and distribution system.

As illustrated in Figures 6, 7 and 8, the casing 65 comprises a bottom wall 65*b*, a vertical side wall 65*c* and an upper wall 65*d*. Side wall 65*c* is provided with a longitudinally extending slot 65*e* and on either vertical sides of the slot is located a plurality of angle supports 65*f* spaced longitudinally along the length of the side walls 65*c* and supporting therefrom a pair of vertically aligned chain guide plates 70 between which runs a chain, indicated generally at 71. The upper reach of the endless chain 71 is returned between a pair of guides 72 supported between additional longitudinally spaced angle supports 65*f* and the upper wall 65*d* of the casing.

The chain 71 is provided with a plurality of laterally extending part flights or plates, indicated generally at 71*a*, 71*b*, and 71*c*, and projecting laterally through the casing slot 65*e*. Secured to the outer surface of the vertical wall 65*c* is an outer vertically extending guide plate 73 secured to the side plate by suitable means, as by spacers 73*a*, having interposed therebetween guide rods 73*b* extending longitudinally of the housing 65 and adapted to guidingly contact a part being moved longitudinally of the casing by the conveyor plate 70. The side plate 73 is provided with a pair of laterally inwardly deflected guide surfaces 73*c* for reducing frictional contact between a part and the side plate. It will be understood that a part passing the escapement mechanism 67 will be contacted by an appropriate conveyor flight 70 and guidingly embraced by rods 73*b*, side plate 73 and additional guide rods 74 carried by the casing immediately adjacent the slot 65*e* therein for guiding the part longitudinally of the casing 65.

In substantial vertical alignment with each of the work stations 66*a*, 66*b*, and 66*c*, the part area 75 defined by the plate 73 and rods 73*b* and 74, within which the part travels communicates with downwardly directed chutes, indicated generally at 76, and specifically illustrated in Figures 6 and 7 of the drawings. The chutes 76 are defined by side plates 77 which are laterally spaced through a distance substantially the same as the thickness of the part, and the upper ends of the chutes are closed by closure doors 78 rotatable with shaft 79. Fixedly secured to the shaft 79 interiorly of the casing 65 is a crank arm 80 having its lower arm forked, as at 81 (Figure 6), to receive an actuating projection 82 carried by the solenoid core 83. The solenoid core 83 forms a part of a solenoid, indicated generally at 85, and actuatable to extend the solenoid core to the left, as viewed in Figure 1, pivoting the shaft 79 and opening the door 78 to establish communication between the parts space 75 and the chute 76 formed intermediate side plates 77 and communicating with one of the work spaces 66*a*, 66*b*, or 66*c*. Obviously, a fluid pressure operated gate may be utilized, if desired.

It will be appreciated that each work station communicates with a chute such as the chute 76 and that the same chute, door and actuating solenoid construction is utilized for each work station.

To actuate the solenoids 85, limit switches 87*a*, 87*b*, and 87*c* are utilized, one of these limit switches being illustrated in detail in Figures 6 and 8 and comprising an angle iron support bracket 88 from which depends a limit switch structure 89 having a depending actuating button 90 adapted to be contacted by a pivotal arm 91 which is pivotally connected to the bracket 88 about a lateral pivot pin 92 adjacent its upper end. Upward actuation of the arm 91 about its pivot pin 92 will upwardly actuate the push button 90 closing the limit switch structure 89.

To actuate the limit switch arm 91, the chain carries a laterally projecting support bracket 93 on which is secured a fixed arm 94 carrying a spring urged shoe 95 projecting upwardly therefrom in laterally spaced relation to the chain 71.

In that embodiment of the invention illustrated in Figure 1 of the drawings, it will be seen that the three work stations 66*a*, 66*b*, and 66*c* are provided and each of the work stations is to receive parts distributed by the conveyor mechanism 71.

It will be noted in connection with Figure 1 that the limit switches 87 which serve to actuate the respective solenoids 85 are located at varying distances longitudinally of the conveyor, or more particularly, in differently longitudinally spaced relation along the lower horizontal flight of the conveyor chain 71.

As heretofore described, parts are advanced along the horizontal reach of the conveyor by the laterally extending part flights or plates 71*a*. These plates are spaced along the length of the conveyor in groups of three, the specific plates being indicated as 71*a*, 71*b*, and 71*c*, and each group of plates being equally spaced in trailing relation behind one of the laterally extending spring-urged shoes 95 heretofore described as utilized to actuate the limit switches 87. When the laterally projecting arm 94 and the shoes 95 carried thereby contact the actuation button 90 of the limit switch 87*a*, the door 78 for the machine station 66*a* is opened. At this time, the pin 71*c* of one of the plurality of sets of pins is vertically aligned with the door so that a part engaged by the arm or pin 71*c* will be free to drop through the opened door 78 into the chute 76. When the projection 95 contacts the limit switch 87*b* to open the door associated with the machine station 66*b*, the pin 71*b* is vertically aligned with the door and a part contacted by the plate 71*b* will pass downwardly through the appropriate guide space 76 to the machine station 66*b*. By the same token, when the plate 95 actuates the limit switch 87*c*, the part contacting plate 71*a* is super-imposed over the door and the chute for the machine station 66*c*. In this manner, each chute door is opened each time that the corresponding limit switch is contacted by the laterally projecting shoe 95. However, the work station will receive a part only when a part is in contact with the appropriate associated part plate 71*a*, 71*b*, or 71*c* on the conveyor 71.

Figure 10:
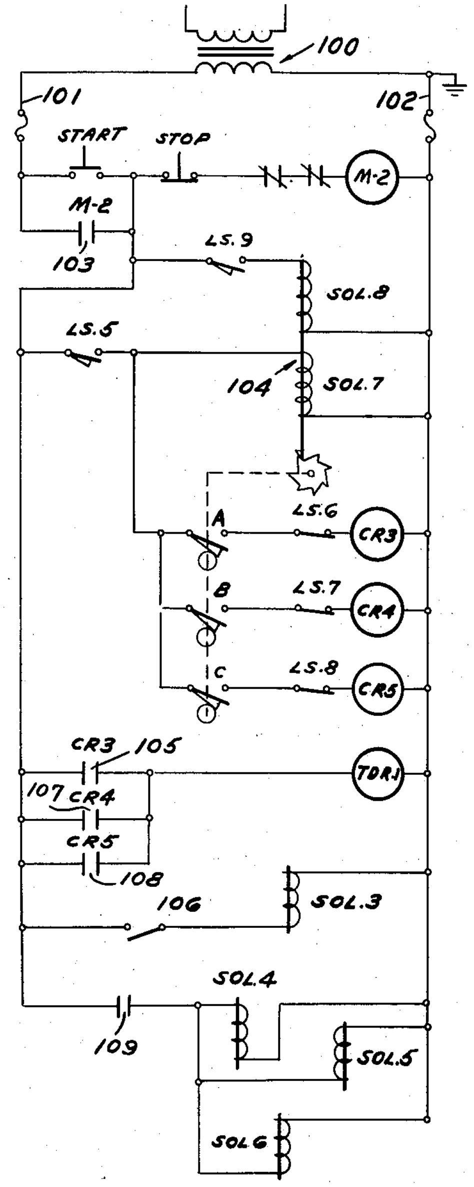
Figure 10 is a diagrammatic representation of a wiring diagram for operating and controlling the parts distribution mechanism.

In order to describe the manner in which the parts are deposited in advance of the appropriate part plate 71*a*, 71*b*, and 71*c* of each group of plates, attention is directed to the wiring diagram of Figure 10.

The control system illustrated in Figure 10 includes a current supply indicated generally at 100, and a pair of current lines 101 and 102. The actuating motors (not shown) are operated through start and stop push button switches which, when the motors are operating, closes a circuit through a relay M2 energizing contacts 103 of a holding circuit by-passing the start button. The line 101 is connected to a limit switch LS5 which is normally open, but which is located as shown in Figure 1, so that a part retained by the escapement mechanism 67 and ready for depositing upon the conveyor will energize this limit switch. Current flow through the limit switch LS5 flows through a plurality of automatically actuated switches A, B and C which are sequentially closed, by means hereinafter described. Completing the circuit from switch A to the line 102 is a limit switch LS6 which energizes a relay CR3. Similarly, the switches B and C complete circuits through limit switch LS7 and relay CR4 and through limit switch LS8 and relay CR5, respectively.

To actuate switches A, B and C in proper sequence, the control system includes a stepping relay, indicated generally at 104, and including a pair of solenoids SOL7 and SOL8. The solenoid SOL7 is energized upon closing of the limit switch LS5, and the operation of the stepping relay is such that the switches A, B and C are closed sequentially in timed relation to the spacing of the part guide plates 71*a*, 71*b* and 71*c*, respectively, on the chain 71.

The limit switches LS6, LS7 and LS8 are located in the supply chutes for the respective work stations 66*a*, 66*b* and 66*c*. If there is a demand for a part at the station 66*a*, the limit switch LS6 will be closed and, upon the closure of the switch A by the stepping relay, a circuit will be completed through the relay CR3. The relay circuit CR3 actuates the relay points 105 to close a circuit through a time delay relay TDR1. The time delay relay TDR1 closes a switch 106 which energizes the solenoid SOL3 which in turn will energize the escapement mechanism 67. As illustrated schematically in Figure 1, the escapement mechanism 67 is of the fluid pressure actuated type, so the solenoid SOL3 may be utilized to control a fluid pressure valve for initiating actuation of the cylinder. The use of the time delay relay TDR1 is to prevent the return of the solenoid SOL3 for a predetermined time to accommodate the full escape of the part from beneath the escapement mechanism and to prevent jamming of this mechanism. It will be noted that the relays CR5 and CR4 similarly control points 107 and 108 which will also actuate the time delay relay TDR1 to similarly actuate the solenoid SOL3 when a demand exists at the appropriate work station to actuate the limit switches LS7 and LS8.

To prevent mis-timing of the stepping relay 104, an additional limit switch LS9 is provided for actuation by a cam (not shown) on the chain 71 so that the latching relay will always be reset to zero position prior to the advent of a new group of pins. Mechanism for such resetting of a stepping relay is well known in the art, and the schemtic illustration merely shows the utilization of the solenoid SOL8 to accommodate such operation.

The control diagram additionally illustrates the provision of solenoids SOL4, SOL5 and SOL6 which are illustrated in Figure 1 as being located in the supply channel for the machine 66*a*, 66*b* and 66*c*, respectively. These solenoids are actuated upon the closure of a pair of relay contact points 109, which points are under the control of a following operation in the manufacturing sequence. Closure of the relay points 109 will simultaneously actuate all of the solenoids to insert stop pins in the supply channels and to thereby shut down further operation of the machine stations. Such a control may be advantageously utilized where the closure of the points 109 is responsive to an oversupply of parts at the later work station and the closure of these points is effective to shut off supply from the work stations 66*a*, 66*b* and 66*c* herein disclosed.

Thus, it will be readily appreciated that the present invention provides a distribution system indicated generally at 22 whereby parts are supplied to a plurality of work stations 66*a*, 66*b* and 66*c* in full response to the demand at the stations. Further, the parts are delivered to a specific station, parts destined for one station cannot be removed at a previous station, and there is no recirculation of parts, since the escapement mechanism 67 cannot be actuated until a demand exists, and the actuation of the escapement mechanism 67 results in the depositing of the part in a specific location upon the chain which can only deliver the part to the work station corresponding to this specific location.

*The embodiment of Figure 11*

In Figure 11, there is provided a modified form of part storage and distribution apparatus which is similar to that heretofore described. The system, indicated generally at 120, comprises a parts storage apparatus, indicated at 121, and including a zig-zag storage track represented schematically at 122. Once again, parts are delivered to the top of the zig-zag storage track 122 for travel therealong, and a plurality of laterally stacked tracks may be provided as heretofore disclosed.

However, at the exit end of the storage track 122, there is located an escapement mechanism 123 such as the mechanism 67 heretofore disclosed. This escapement mechanism 123 controls the flow of parts from the storage track 122 onto a vertically traveling conveyor, indicated at 125. The conveyor 125 travels vertically from the escapement mechanism for a distance of 90 degrees about a sprocket or similar guide 126 and then horizontally through the distribution system, indicated generally at 127. The distribution system 127 is provided with a delivery chute 128 having a door located at the upper end thereof controlled by a limit switch, indicated generally at 129, all as heretofore disclosed. The conveyor 125 is provided with a plurality of sets of parts advancing units or plates 125a, 125b and 125c, and with a laterally projecting switch actuation plate 130 substantially identical with the spring-urged shoe 95 heretofore described.

In the operation of the device of Figure 11, when a demand exists at the machine serviced by the chute 128, this demand actuates the escapement mechanism 123, as heretofore described, to deposit a part upon one of the parts carrying plates 125a, 125b and 125c. Upon actuation of the limit switch 129 by the plate 130, a part carried by the plate 125 will be dispensed through the chute 128 to the machine serviced thereby.

Thus, the embodiment of Figure 11 differs from that of Figure 1, as heretofore described, only in that the parts are dispensed in the proper sequence directly from the zig-zag storage track 122 onto the parts distribution conveyor. The return loop of the conveyor 125 passes about an idler sprocket or pulley 131 for return about a drive pulley 132.

*The embodiment of Figures 12–15*

In Figures 12–15 of the present invention, there is shown another alternative type of structure which operates in much the same manner, but which utilizes a different type of automatic demand drop gate.

Figure 12:
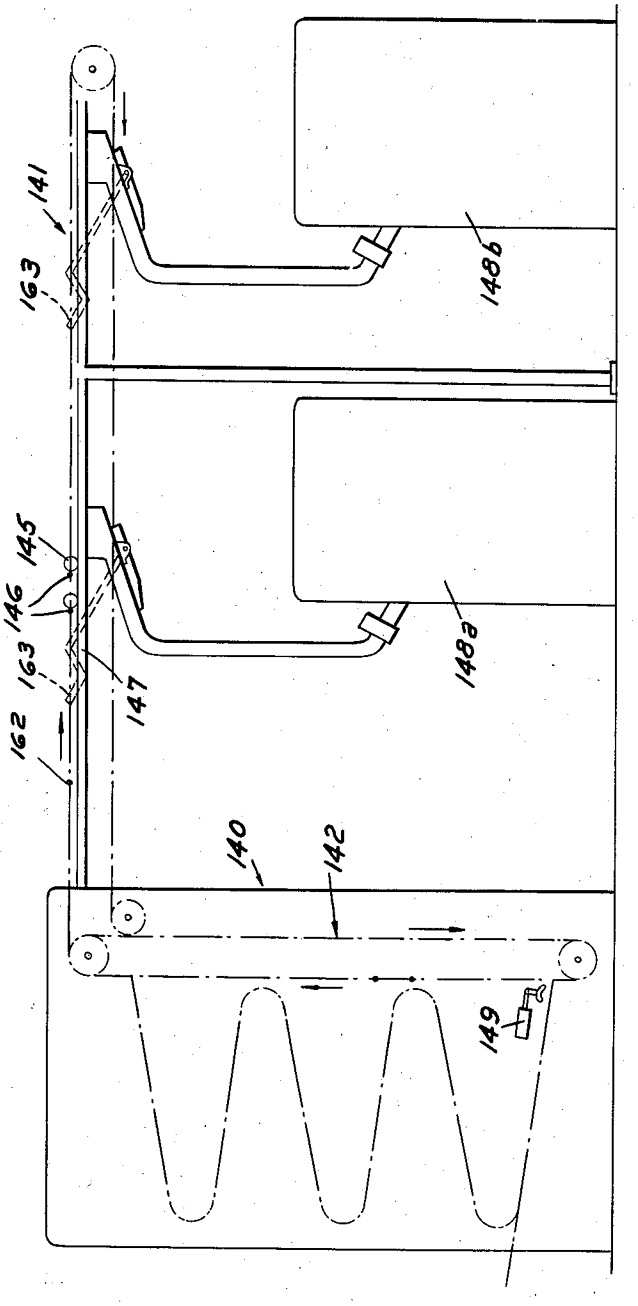
Figure 12 is an enlarged fragmentary sectional view of a different form of automatic storage and distribution demand-type system utilizing another form of drop gate.

The device as schematically illustrated in Figure 12, is of the same over-all type as that illustrated in Figure 11. That is, the storage unit 140 and the distribution unit 141 are joined by a common conveyor 142, in the same manner as the units 121 and 127 are joined by the conveyor 125 in the embodiment of Figure 11.

Figure 13:
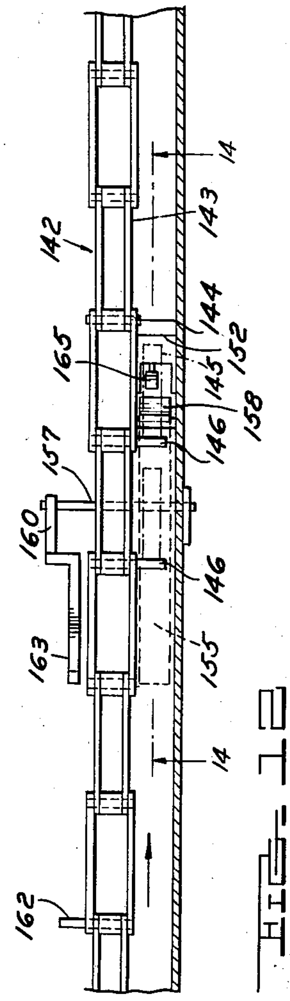
Figure 13 is a plan view of the system of Figure 12.

As illustrated in detail in the plan view of Figure 13, the conveyor chain is of the type having parallel, longitudinally extending links 143 joined by transversely extending pins 144 and provided with longitudinally spaced, laterally extending pusher pins 146 adapted to contact parts 145 and to move the part along the track defined by a floor 147 overlying the machine stations 140a and 140b, the floor 147 forming a part of the distribution system casing.

The conveyor 142 is provided with a pair of sets of the longitudinally spaced pusher pins 146, the system being provided with only two drop stations 140a and 140b for clarity of illustration.

An escapement mechanism 149, identical with the escapement mechanism heretofore described in connection with the embodiment of Figures 1–10, is provided for operation under the control of a solenoid, as will be hereinafter more fully described.

The drop stations 140a and 140b are joined to the conveyor floor through a generally, vertically extending chute 150 adapted to retain a vertical stack of parts and having its upper end deflected to slope generally upwardly and longitudinally in the direction of travel of the loaded flight of the conveyor 142, as at 151. This upper portion 151 of the chute 150 communicates with the conveyor through an opening 152 which is of such size that a part 145 may drop vertically from the conveyor through the opening into the chute. The sloping portion 151 of the chute 150 is provided with a floor opening 153 into which projects a portion of a drop gate, indicated generally at 155. This drop gate 155 comprises a medially pivoted lever 156 pivotally attached to the chute, as at 157. One end of the lever is co-planar with the floor of the chute portion 151, while the other end is provided with an upstanding projection 158 projecting into the chute generally beneath the aperture 152 so that a part 145, entering the chute through the aperture 152, will be stopped by the projection 158 from continuing its travel on downwardly through the chute. A generally vertically extending actuation arm 160 is pivoted on the pin 157 and is connected to the lever 156 through a torsion spring 161 which will accommodate relative movement between the lever and the arm in case arm movement is prevented, but which will accommodate co-movement of the arm and the lever in the event that free lever movement is possible.

Figures 14, 15:
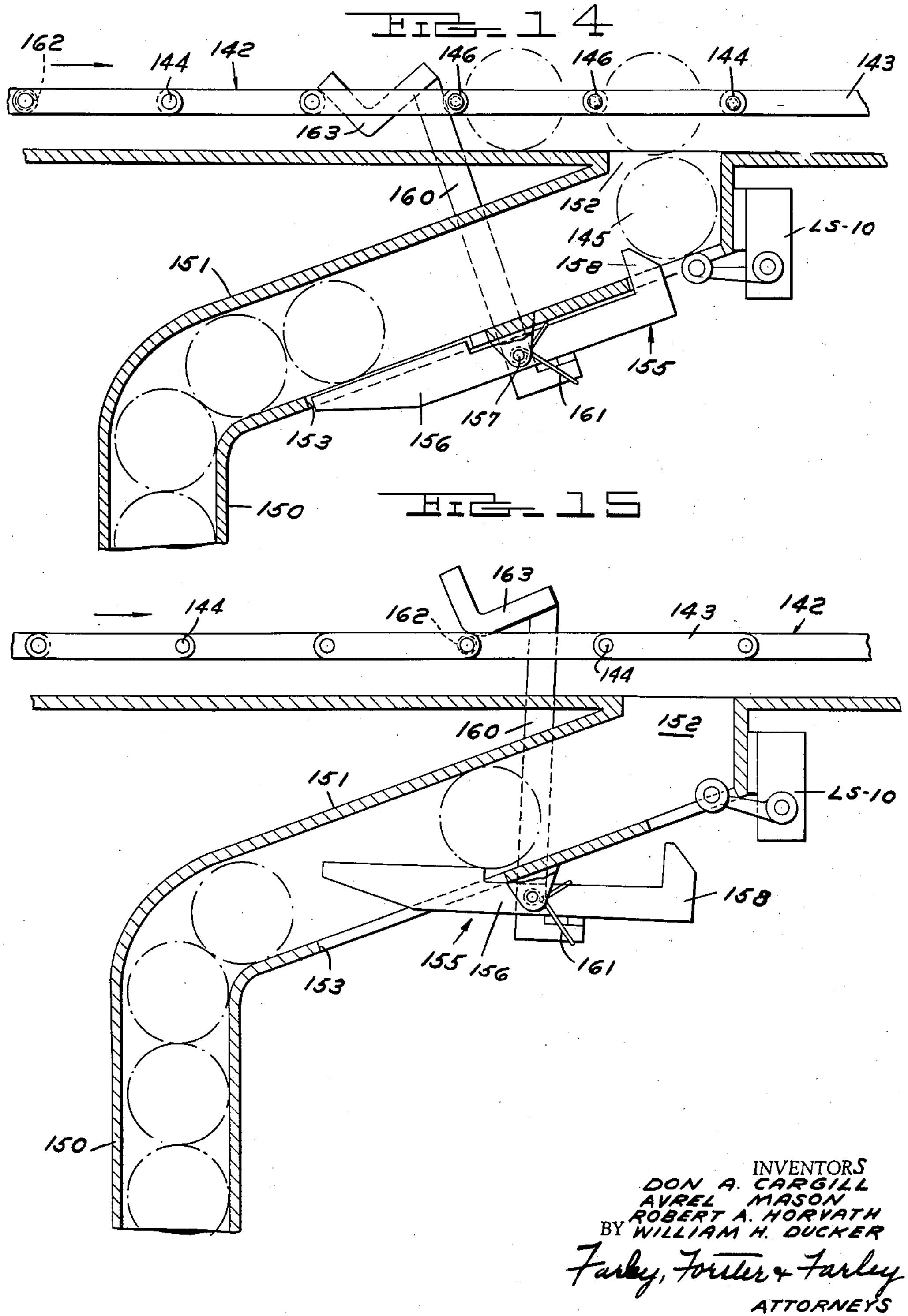
Figure 14 is an enlarged, fragmentary sectional view with parts shown in elevation taken along the plane 14—14 of Figure 13.
Figure 15 is a view similar to Figure 14, but showing the drop gate in an adjusted position.

From a comparison of Figures 14 and 15, it will be seen that the conveyor 142 is provided with a laterally projecting index pin 162 which projects laterally for contacting the generally, vertically extending cam face 163 formed at the upper end of the arm 160. After contact between the index pin 162 and the cam face 163 has been established, further advancing movement of the conveyor will elevate the upper end of the arm as the cam face rides over the pin. If there is a part 145 interposed between the free lower end of the lever 156 and the channel, the arm will merely be moved relative to the lever against the force of the torsion spring 161. The lever will not be moved under these circumstances. In the event that there is no part, the part having been moved vertically in the channel downwardly toward the work station by the normal use of such parts, then the lever will be tilted to the position of Figure 15, and the projection 158 will be removed from the position of the previous part 145, so that this part will roll downwardly into the channel proper. A part 145 carried by one of the push pins 146 and registering with the aperture 152 will be free to drop into the channel for abutment with the projection 158 to be retained there for the next dispensing movement. It will be seen that when a part 145 is not seated upon the projection, the spring-urged arm 165 of limit switch LS10 is free, thus closing limit switch LS10 to give a signal to the escapement 149 that a part is required at the work station.

The embodiment of Figures 12–15 utilizes a control system similar to that illustrated in Figure 10 and described in detail heretofore. The limit switch LS10 and the corresponding switch for the other drop gate 155 correspond to the limit switches LS6 and LS7 of the wiring diagram of Figure 10, these switches reflecting the demand for parts at the work stations. When the stepping solenoid 104 closes the switches A and B, the closure of either the limit switches LS10 will effect a circuit through the solenoid for the escapement 149, corresponding to the solenoid SOL3 to energize the escapement for placing a part in advance of the proper pusher pin 146.

It will be noted that the system illustrated schematically in Figure 12 is provided only with two sets of a pair of pusher pins 146, and the stepping solenoid 104 is energized only when a pin of these two sets of pins is located in proper position relative to the escapement 149 to receive a part destined for one or another of the drop gates 155.

Additionally, it will be noted that the index pin 162 trails the pusher pins 146 by a substantial distance. This is to prevent the dispatching of a part to a station at which a demand momentarily exists but not the station for which the specific part was located upon the appropriate pusher pin. In other words, even if the lever 156 were free to move, the lever will not dispense a part 145 from its elevated position in the channel upon the projection 158 until after any parts conveyed by the pusher pins have already passed the drop gate. In this manner, the part on the pusher pin destined for the second work station 140b will not be dispensed at the station 140a, since there is no place for the part to drop, the opening 152 being closed by the part 145 seated against the projection 158. After the index pin has shifted the lever to remove the projection 158, the part 145 may then drop into the channel and the signal will then be given by the limit switch. The limit switch, in cooperation with the stepping solenoid 104, will now effect the depositing of a part upon the next pusher pin which passes the escapement mechanism 149.

Figures 16, 17:
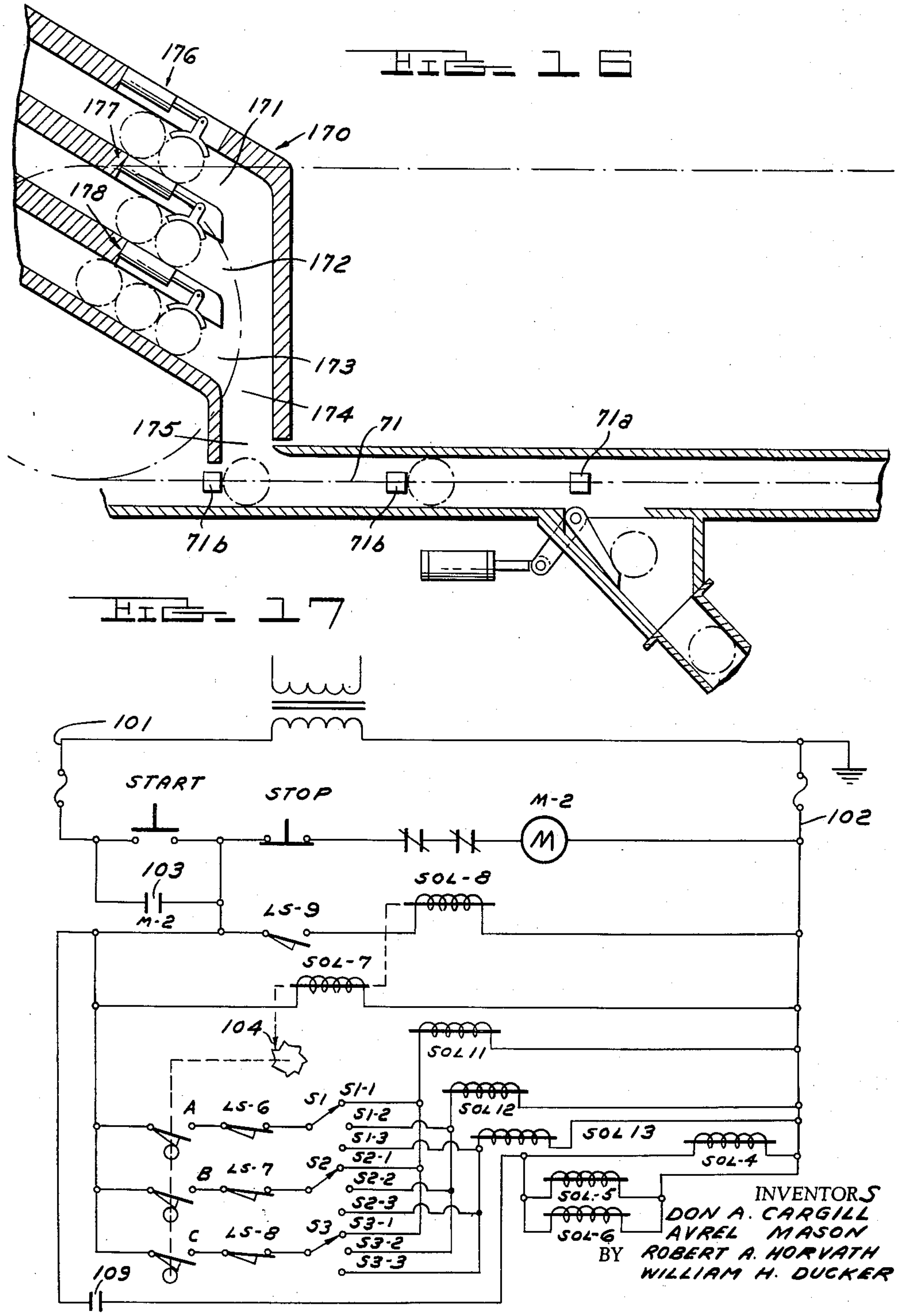
Figure 16 is a fragmentary schematic view similar to Figure 1 illustrating a different type of escapement mechanism.
Figure 17 is a diagrammatic representation of a wiring diagram similar to Figure 10 but adapted for the embodiment of Figure 16.

*The embodiment of Figures 16 and 17*

In the embodiments of the invention illustrated in Figures 16 and 17, the device is substantially the same as that illustrated schematically in Figure 1 of the drawings. However, the mechanism at the point of transition from the storage unit 21 to the distribution unit 22 has been changed, so that parts from a plurality of storage units can be selectively introduced upon the distribution unit conveyor mechanism.

More specifically, in Figure 16, reference numeral 170 refers to a multiple delivery chute construction having superimposed, vertically aligned passages 171, 172 and 173, all of which communicate with a vertically extending passage 174 which, in turn, opens on the conveyor. Each of the passages or chutes 171, 172 and 173 communicates with a different storage unit, preferably of the type illustrated in Figures 2–5, inclusive. Each of the chutes contains an escapement mechanism 176, 177 and 178, respectively, to control the flow of parts from the chute to the conveyor passage 174. A part deposited on the conveyor 71 is moved along the conveyor path by the proper one of the pins **71*a*, 71*b* and 71*c***.

The functioning of the distribution mechanism to distribute the parts to the proper working station has been heretofore described.

The operation of the escapement mechanisms 176, 177 and 178 is illustrated in Figure 17, wherein it will be seen that the wiring diagram is substantially the same as that illustrated in Figure 10 of the drawing. However, it will be seen from Figure 17 that additional switches S1, S2 and S3 are interposed between the limit switches LS6, LS7 and LS8 which are actuated in response to the demand for parts at any given one of the work stations **66*a*, 66*b* and 66*c***, respectively.

These additional switches each comprise a switch arm movable to three contacts. For example, the arm of switch S1 is movable to the contact S1–1 to energize the solenoid SOL11 for the escapement mechanism 176 when the demand switch LS6 is closed and the stepping relay 104 has closed the switch A. This same solenoid SOL11 can be energized in response to a demand at the work station **66*b* if the arm of switch S2 is positioned on the contact S2–1. Similarly, the escapement 176 is energized by demand at the work station 66*c* if the arm of switch S3 is located at the contact S3–1. The arms of the switches S1, S2 and S3 are manually movable to their indicated contact points, and closure of the contact points S1–2, S2–2 and S3–2 by any one of the arms will energize the solenoid SOL12 of the escapement 177. Similarly, movement of the arms of the switches to the contacts S1–3, S2–3 and S3–3 will effect energization of the solenoid SOL13 for the escapement 178. Inasmuch as the switches S1, S2 and S3 form a portion of a demand control system similar to that in Figure 10, energization of the escapements can occur only upon demand at the appropriate machine station and proper alignment of the respective pins with the opening of the escapement chute 174, as reflected by the stepping solenoid 104**.

It will be noted that there is no equivalent switch corresponding to LS5 to indicate the presence of a part beneath the escapement mechanisms 176, 177 and 178. If desired, such supply demand switches may be readily supplied.

The advantages of the embodiment of the invention shown in Figures 16 and 17 will be readily understood, since it makes possible the supplying of different types of parts to a plurality of work stations by the utilization of a single part distribution mechanism. Individual storage units are provided to supply these parts upon demand, as heretofore described, the parts being supplied to the conveyor through the multiple-supply inlet passage 174. The device for supplying these different parts through a single distribution unit is particularly useful in connection with the supplying of parts of substantially the same external dimensions and contour, but of differing physical characteristics or identity.

The utilization of the multiple switch arrangement S1, S2 and S3 makes possible the separate dispensing and separate identification of these various parts even though the various parts are being worked upon at the same bank of machine stations.

While preferred embodiments have been described above in detail, it will be understood that numerous modifications might be resorted to without departing from the scope of this invention as defined in the following claims.

We claim:

1. A storage and distribution system for supplying parts to a plurality of work stations comprising a storage unit containing a plurality of parts, a distribution unit including a conveyor having a plurality of parts-advancing means for receiving parts from said storage unit, said means each corresponding to one of said stations, respectively, a parts-receiving passage traversed by said conveyor and means controlling communication with said passage adapted to be actuated by traversing movement of said conveyor, signal means at each station responsive to the demand for parts at that station, and escapement means interposed between said conveyor and said storage unit for depositing a part on the conveyor at the appropriate parts-advancing means in response to said signal means.

2. In a parts distribution mechanism for supplying parts to a work station, a traveling conveyor, an energizable escapement for supplying parts to said conveyor, spaced parts-advancing elements on said conveyor adapted to receive parts from said escapement, and an electric control circuit including switch means responsive to the demand for parts at the work station and means responsive to travel of the conveyor for energizing the escapement to supply parts to the conveyor.

3. In a distribution system for supplying a plurality of work stations from a storage unit in which a plurality of parts are stored, the improvements of a distribution unit interposed between the storage unit and the work stations, comprising conveying means receiving parts from said storage unit and adapted to convey such parts to said work stations, means responsive to a demand at one of the work stations for depositing a part on said conveying means at a predetermined location corresponding to the station at which the demand exists, and means responsive to travel of the conveying means for establishing communication between the conveyor and the work station.

4. In a distribution system for supplying parts to a plurality of work stations from a storage unit containing a plurality of parts, the improvements of a distribution unit including a conveyor having a plurality of groups of parts-advancing means adapted to receiving parts from said storage unit, said means each corresponding to one of said stations, respectively, a parts-receiving passage traversed by said conveyor and means controlling communication with said passage adapted to be actuated by traversing movement of each group of parts-advancing means on said conveyor, signal means at each station responsive to the demand for parts at that station, and means for depositing parts on the conveyor at the appropriate parts-advancing means in response to said signal means.

5. In a parts distribution system, a conveyor, a plurality of parts-engaging elements on the conveyor arranged in groups, each group of elements including an element corresponding to each of a plurality of work stations, and means for depositing a part on the conveyor in accordance with a demand at one work station, said means including an escapement and a control circuit for actuating the escapement, said circuit having a demand responsive switch for each station and a sequentially actuated series of switches arranged in series with the demand responsive switches and corresponding to the individual elements of each group of elements.

6. In a storage and distribution system, means for supplying parts from a common source through a plurality of storage units to a plurality of work stations on a first in-first out basis wherein demands of successive work stations are automatically sequentially equally supplied and wherein parts automatically pass through successive storage units without banking as long as work station and storage unit demands are not filled, said means being characterized by a plurality of gravity feed storage units having top entrances and bottom exits, means for delivering successive individual parts from the exit of each preceding storage unit to the entrance of each succeeding storage unit, means responsive to a filled condition of any succeeding storage unit for preventing said delivery, conveyor means traversing the exit of the last storage unit and said work stations, means responsive to successive work station demands for effectiing delivery of successive parts from said last storage unit exit to said conveyor means, and selective means for effecting successive delivery of said parts from said conveyor means to the corresponding work stations from which said successive demands originated, a plurality of parts are gravitationally advanced along an inclined track, a brake mechanism for controlling the rate of advance of the parts, comprising a plate parallel to the track, a rotatable cam underlying the track, and a cam follower operatively interconnecting the plate and the cam, so that the plate is lowered into and elevated from contact with the parts on the track.

7. In a parts distribution system, a conveyor, a plurality of parts-engaging elements on the conveyor arranged in groups, each group of elements including an element corresponding to each of a plurality of work stations, and means for depositing a part on the conveyor in accordance with a demand for a particular type of part at one work station, said means including a plurality of parts storage units, means establishing communication from each of said storage units to the conveyor, an escapement controlling the flow of parts from each of said storage units to said conveyor, and a control circuit for actuating the escapement and including a demand responsive switch for each station and selector switches for routing the demand from each of said stations to a selected one of said escapements.

8. In a parts distribution mechanism for supplying parts to a plurality of work stations from a plurality of storage units in each of which a different type of part is stored, conveying means traversing the working stations, an escapement mechanism controlling the flow of parts from each of said storage units to the conveying means, a demand actuated parts level control means at each of the stations, selector means at each work station for determining the type of part to be supplied to that one work station, means responsive to the control means and the selector means for actuating the appropriate escapement mechanism to introduce a specific type of part onto a specific portion of the conveying means identified for delivery to a specific work station, and means responsive to the specific location of said part on said conveyor means for effecting delivery to the correct work station.

9. A parts distribution mechanism for supplying parts from a plurality of storage units in each of which a different type of part is stored to a plurality of work stations comprising, conveyor means traversing the work stations having a plurality of part engaging elements arranged in groups, each group of elements including an element corresponding to each of the work stations, escapement mechanism controlling the flow of parts from each of said storage units to the conveying means, a demand actuated parts level control means at each of the work stations, selector means at each work station for determining the type of part to be supplied to that work station, means responsive to the control means and the selector means for actuating the appropriate escapement mechanism to introduce a specific type of part into engagement with one of said elements corresponding to the demanding work station, and means responsive to the specific location of said part on said conveyor means for effecting delivery to the demanding work station.

10. A parts distribution mechanism for supplying parts from a plurality of storage units in each of which a different type of part is stored to a plurality of work stations comprising, conveyor means traversing the work stations having a plurality of part engaging elements arranged in groups, each group of elements including an element corersponding to each of the work stations, an escapement mechanism controlling the flow of parts from each of the said storage units to the conveyor means, a demand actuated parts level control means at each of the stations, means for determining the type of part to be supplied to each work station, means responsive to said last means and parts level control means for actuating the appropriate escapement mechanism to introduce a specific type of part into engagement with one of said elements corresponding to the demanding work station, and means responsive to the specific location of said part on said conveyor means for effecting delivery to the demanding work station.

11. A method of storing and distributing to a plurality of work stations a plurality of different types of parts comprising, establishing a demand energy signal directly responsive to reduction of quantity below a predetermined number at any of the work stations identifying the type of part required and the demanding work station, transmitting said demand energy signal to a storage area and utilizing the energy of said demand energy signal to directly actuate a mechanism to effect delivery of a corresponding type of part from said storage area for such parts onto a particular portion of a common distributing conveyor identified by means carried on the conveyor with the demanding work station, and utilizing said means on the conveyor associated with the said deposited part for discriminating between stations traversed thereby and selectively effecting delivery of the part to the demanding work station by a mechanism directly responsive to said means on the conveyor.

References Cited in the file of this patent

UNITED STATES PATENTS

| | | |
|---|---|---|
| 746,247 | Baggaley | Dec. 8, 1903 |
| 762,508 | Weld | June 14, 1904 |
| 881,940 | Morton | Mar. 17, 1908 |
| 1,159,728 | Stafford | Nov. 9, 1915 |
| 2,115,647 | Ross | Apr. 26, 1938 |
| 2,146,533 | Erickson | Feb. 7, 1939 |
| 2,221,396 | Evoy | Nov. 12, 1940 |
| 2,273,583 | Meister | Feb. 17, 1942 |
| 2,285,931 | Kruckewitt et al. | June 9, 1942 |
| 2,360,583 | Riehl | Oct. 17, 1944 |
| 2,430,407 | Nelson | Nov. 4, 1947 |
| 2,470,922 | Dunn | May 24, 1949 |
| 2,558,751 | Hebert | July 3, 1951 |
| 2,600,038 | Whaley | June 10, 1952 |
| 2,652,301 | Skillman et al. | Sept. 15, 1953 |
| 2,661,828 | Vogt et al. | Dec. 8, 1953 |
| 2,666,535 | Dooley | Jan. 19, 1954 |
| 2,734,620 | Fischer et al. | Feb. 14, 1956 |
| 2,772,005 | Dubin et al. | Nov. 27, 1956 |
| 2,789,678 | Hickin | Apr. 23, 1957 |

FOREIGN PATENTS

| | | |
|---|---|---|
| 367,974 | Great Britain | Mar. 3, 1932 |